United States Patent
Skjaerseth et al.

(10) Patent No.: US 9,600,716 B2
(45) Date of Patent: Mar. 21, 2017

(54) METHOD FOR MOVEMENT IN A PHYSICALLY CONFIGURABLE SPACE AND DEVICE FOR USE WITH THE METHOD

(71) Applicant: Klatrefabrikken AS, Stavanger (NO)

(72) Inventors: Eirik Skjaerseth, Stavanger (NO); Morten Finnes, Stavanger (NO)

(73) Assignee: Bolder AS

( * ) Notice: Subject to any disclaimer, the term of this patent is extended or adjusted under 35 U.S.C. 154(b) by 64 days.

(21) Appl. No.: 14/388,339

(22) PCT Filed: Mar. 20, 2013

(86) PCT No.: PCT/NO2013/050056
§ 371 (c)(1),
(2) Date: Sep. 26, 2014

(87) PCT Pub. No.: WO2013/147614
PCT Pub. Date: Oct. 3, 2013

(65) Prior Publication Data
US 2015/0057776 A1   Feb. 26, 2015

(30) Foreign Application Priority Data
Mar. 30, 2012 (NO) .................................. 20120399

(51) Int. Cl.
*A63F 9/24* (2006.01)
*G06K 9/00* (2006.01)
(Continued)

(52) U.S. Cl.
CPC ...... *G06K 9/00342* (2013.01); *A63B 24/0075* (2013.01); *A63B 69/0048* (2013.01);
(Continued)

(58) Field of Classification Search
None
See application file for complete search history.

(56) References Cited

U.S. PATENT DOCUMENTS

| 5,527,239 A | * | 6/1996 | Abbondanza | A63B 22/02 482/1 |
| 6,414,629 B1 | * | 7/2002 | Curcio | B63C 9/0005 342/357.52 |

(Continued)

FOREIGN PATENT DOCUMENTS

| GB | 2470370 | 11/2010 |
| WO | 9519602 | 7/1995 |

(Continued)

OTHER PUBLICATIONS

International Search Report and Written Opinion for PCT/NO2013/050056, dated Jun. 27, 2013.

*Primary Examiner* — Paul D'Agostino
(74) *Attorney, Agent, or Firm* — Andrus Intellectaul Property Law, LLP

(57) ABSTRACT

A method is for movement in a physically configurable space. The space includes one or more physically configurable elements. A first user is in a first location and in a first position in the physically configurable space. The method includes providing the physically configurable space with at least one sensor, connecting the at least one sensor to a control unit, and sensing at least the first user's first location in the physically configurable space by the at least one sensor. The method further includes configuring the at least one configurable element by the control unit on the basis of sensed information from the at least one sensor so that the first user's allowed moving space is altered. A configurable space is for use with the method.

16 Claims, 6 Drawing Sheets

(51) Int. Cl.
*A63B 69/00* (2006.01)
*A63B 71/06* (2006.01)
*A63B 24/00* (2006.01)
*A63B 71/00* (2006.01)

(52) U.S. Cl.
CPC ...... *A63B 71/0616* (2013.01); *A63B 71/0622* (2013.01); *A63B 71/0054* (2013.01); *A63B 2024/009* (2013.01); *A63B 2024/0068* (2013.01); *A63B 2071/0694* (2013.01); *A63B 2207/02* (2013.01); *A63B 2220/13* (2013.01); *A63B 2220/56* (2013.01); *A63B 2220/64* (2013.01); *A63B 2220/72* (2013.01); *A63B 2220/805* (2013.01); *A63B 2220/806* (2013.01); *A63B 2220/833* (2013.01); *A63B 2220/836* (2013.01); *A63B 2225/54* (2013.01); *A63B 2230/505* (2013.01); *A63B 2230/655* (2013.01)

(56) References Cited

U.S. PATENT DOCUMENTS

| | | | |
|---|---|---|---|
| 6,418,372 B1 | 7/2002 | Hofmann | |
| 6,430,997 B1 | 8/2002 | French et al. | |
| 6,736,759 B1* | 5/2004 | Stubbs | A63B 22/00 482/5 |
| 7,627,451 B2 | 12/2009 | Vock et al. | |
| 7,771,320 B2 | 8/2010 | Riley et al. | |
| 2003/0163283 A1* | 8/2003 | O'Brien | A43B 3/00 702/160 |
| 2003/0170599 A1* | 9/2003 | Hart | A63B 69/3608 434/252 |
| 2004/0051644 A1 | 3/2004 | Tamayama et al. | |
| 2007/0085682 A1 | 4/2007 | Murofushi et al. | |
| 2007/0146136 A1 | 6/2007 | Chen et al. | |
| 2007/0289044 A1* | 12/2007 | Ellis | A42B 3/30 2/6.2 |
| 2008/0293470 A1 | 11/2008 | Proud et al. | |
| 2011/0022201 A1 | 1/2011 | Reumerman et al. | |

FOREIGN PATENT DOCUMENTS

| | | |
|---|---|---|
| WO | 2005049155 | 6/2005 |
| WO | 2005120660 | 12/2005 |
| WO | 2006111737 | 10/2006 |
| WO | 2008046443 | 4/2008 |

* cited by examiner

METHOD FOR MOVEMENT IN A PHYSICALLY CONFIGURABLE SPACE AND DEVICE FOR USE WITH THE METHOD

CROSS-REFERENCE TO RELATED APPLICATIONS

This application is the U.S. national stage application of International Application PCT/NO2013/050056, filed Mar. 20, 2013, which international application was published on Oct. 3, 2013, as International Publication WO2013/147614 in the English language. The international application is incorporated herein by reference, in entirety. The international application claims priority to Norwegian Patent Application No. 20120399, filed Mar. 30, 2012, which is incorporated herein by reference, in entirety.

FIELD

The invention relates to a method for movement in a physically configurable space. More specifically, the invention relates to a method for movement in a space including one or more physically configurable elements, a user being present in the physically configurable space, one or more sensors connected to a control unit registering the location of the user in the space, and the control unit configuring the at least one configurable element in response to the information read by the at least one sensor, among other things. The invention also relates to a physically configurable space for use with the method.

In what follows, the at least one physically configurable element will be exemplified by a climbing wall, among other things, but the invention is not limited thereto, and the physically configurable space could also include, among other things, a skateboard ramp, a parkour (free running) park, a gymnastics floor and other conventional gymnastics and acrobatics apparatuses such as climbing ropes, gymnastics rings and so on.

BACKGROUND

At a fitness centre, a user will often be left to himself and the progression in training and variation in exercises will often be the user's own responsibility. The training will often be repetitive, unbalanced in stress, not very inspiring and with no or little progress.

Today, an artificial climbing wall includes panels with screw-on holds. The holds come in various shapes, colours and sizes. A climbing route is formed by setting all the holds allowed in the route in one and the same colour, for example. A user may also make/improvise on a climbing route himself at his own desire. Information about which holds are part of such an improvised route is passed orally to other users who want to copy the route. When different colour combinations are used, there will be limitations on the placing of holds as it is often not practically possible to place the holds more tightly than with a spacing of approximately 20 cm and the number of colours that are easily distinguishable is limited. Further, the holds become worn and soiled with magnesium and friction rubber that are used during climbing, so that colour combinations or other marks defining a climbing route become worn and thereby difficult to recognize. Today, a user will often spend a great deal of his training time on locating holds within a climbing route and planning what movement patterns will have to be used to be able to climb the route. Also, climbing centres are not laid out symmetrically with a view to enabling mirrored movement patterns and thereby avoiding unbalanced stress and injuries related thereto.

SUMMARY

The invention has for its object to remedy or reduce at least one of the drawbacks of the prior art or at least provide a useful alternative to the prior art.

The object is achieved through features which are specified in the description below and in the claims that follow.

By a user are meant, in what follows, a person who is in the physically configurable space, and various equipment that the user is making use of, whether it be climbing gear, balls, rackets and so on.

By a user's allowed moving space are meant, in what follows, the movements, positions, directions of motion, movement areas and so on. A movement area is defined by a frame of movement.

In a first aspect, the invention relates to a method for movement in a physically configurable space, the space including one or more physically configurable elements, a first user being at a first location and in a first position in the physically configurable space, and the method including:
  providing the physically configurable space with at least one sensor;
  connecting the at least one sensor to a control unit; and
  sensing at least the first user's first location in the physically configurable space by means of the at least one sensor, characterized by the method further including the step of:
  configuring the at least one configurable element by means of the control unit on the basis of sensed information from the at least one sensor so that the allowed moving space of the first user is altered.

The configuration of the at least one configurable element may take place in the form of, for example, changes in light, colour and/or graphics in the at least one configurable element. It may be light signals being switched on or off or some other type of configuration which is perceivable by a user. It may also be in the form of sound signals.

In one embodiment, the method may include configuring the at least one configurable element in such a way that an instruction is given to the first user to move to another location and/or position in the physically configurable space.

In another embodiment, the method may include configuring the at least one configurable element in such a way that the allowed frame of movement of the first user is altered. The frame of movement may, in its widest sense, be a boundary frame on a court for ball games or the like, whether that be a basketball court, a football field, or tennis court and so on.

In a more advanced version, the configuration may include live pictures or animations played back or projected on a surface or an object in the configurable space. Said object may also be a set of digital glasses that is worn by the user.

In a first embodiment, the method may further include storing information about the first user's physical data in the control unit. That may be, for example, the user's weight, height, age, lengths of legs and arms, muscle mass, resting pulse, maximum pulse, oxygen uptake and so on.

In a second embodiment, the method may additionally or as an alternative include storing information in the control unit about the first user's movements in the physically configurable space.

In a third embodiment, the method may additionally or as an alternative include storing information in the control unit about a second user's movement in the physically configurable space.

In a preferred embodiment, the method may include using at least parts of the above-mentioned stored information to configure the at least one configurable element. It may be in order to prepare an instruction to the first user that he should move to the second location and/or position, or it may be in order to change the user's frames of movement. This will be beneficial as the at least one configurable element may be configured to set up a moving space that is matched to the individual user and his needs and wishes. For example, there may be a wish to improve the user's capacities by expanding his moving space. By storing information on the movements of other users as well, potential movement patterns and moving spaces could be retrieved from the storage unit and used for guidance and/or inspiration to the first user.

In one embodiment, the method may further include providing the first user with one or more transmitters arranged to output a signal that can be sensed by the at least one sensor. The first user may, for example, be provided with a radio-frequency identification (RFID) tag. The RFID tag may be of an active or passive type known per se. The second user may also be provided with transmitters.

In a second aspect, the invention relates to a physically configurable space, the space including:
one or more physically configurable elements;
at least one sensor arranged to sense at least a first user's location in the space; and
a control unit, to which the at least one sensor is connected, characterized by the control unit being arranged to configure the at least one configurable element on the basis of sensed information from the at least one sensor, so that the allowed moving space of the user is altered.

The control unit may include a storage unit arranged to store data.

In one embodiment, at least one of said at least one sensor may be taken from the group of:
an optical sensor;
a pressure sensor;
a temperature sensor;
an electrical resistance sensor; and
a radio-frequency sensor.

An optical sensor may include various forms of electro-optical sensors. It may be, for example, a location sensor in which the presence of a user is sensed by the user breaking a light beam. Optical sensors may also include different forms of cameras which, by means of image recognition and associated processing software, for example, or by triangulation or the like, are arranged to calculate a user's location, position and movement in the space by means of algorithms known per se. By a pressure sensor is meant a sensor which is arranged to sense a user's location in the space by the user's touch, in the form of a pressure change on or at the sensor. A temperature sensor could sense a user's location through his contact or proximity to the sensor in the form of a temperature change. By an electrical resistance sensor are meant all forms of sensors reading a change in the electrical resistance. This includes, among other things, different types of touch screens that are known from mobile phones, among other things, in which a touch results in altered electric voltages either directly or indirectly in consequence of altered capacitance or altered flow patterns of surface acoustic waves. The at least one sensor may also be a radio-frequency sensor for reading data from the above-mentioned RFID tags. The above-mentioned sensors may be of types known per se.

The sensors could be used, individually or in combination, for sensing, among other things, the user's location, position, time consumption in and between locations and/or positions, distances between locations and the contact area at a location. Further, the user's speed, acceleration and power in different directions may be sensed directly or calculated by means of the above-mentioned information. The data may be stored in the control unit and be used in future to recreate a user's movement in the configurable space, among other things.

In one embodiment, the physically configurable space may be symmetrically configurable. This means that at least a configurable element in the space is arranged to be configured symmetrically around a mirror axis. This will be appropriate as a user may perform a second movement sequence laterally inverted to a first movement sequence so that balanced stress may be achieved and injuries related to unbalanced stress are avoided.

Also, a number of substantially identical, physically configurable spaces could be established, the various physically configurable spaces being connected to the same control and/or storage unit so that movement sequences that are carried out in one physically configurable space could be stored and thereby be available and possibly recreatable in another physically configurable space.

BRIEF DESCRIPTION OF THE DRAWINGS

In what follows, examples of preferred embodiments are described, which are illustrated in the accompanying drawings, in which.

DETAILED DESCRIPTION OF THE DRAWINGS

Figure 1:
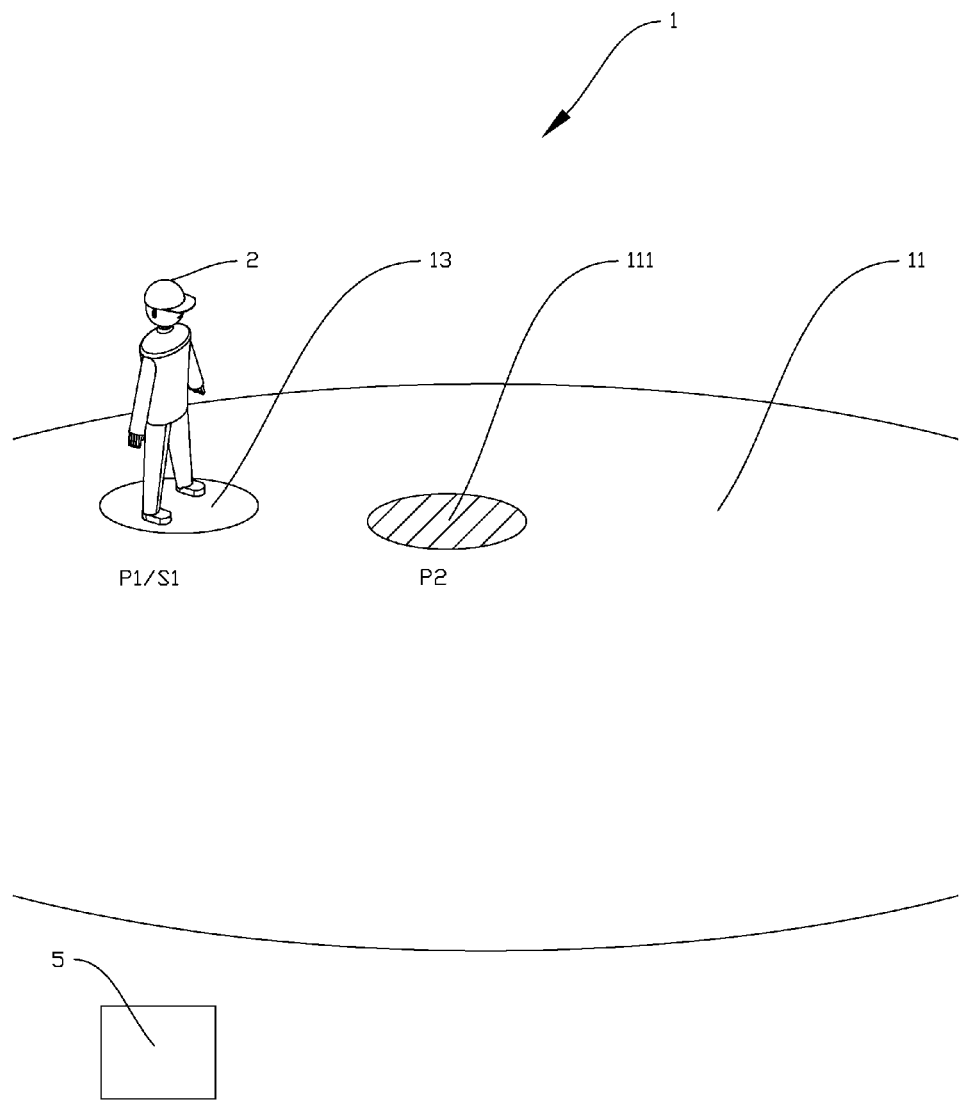
FIGS. 1-2 show a first embodiment in accordance with the present invention, viewed in perspective.

In what follows, the reference numeral 1 indicates a physically configurable space in accordance with the present invention, and like reference numerals indicate like or corresponding elements. In the figures, the physically configurable space 1 is drawn schematically and in a highly simplified manner.

Figure 2:
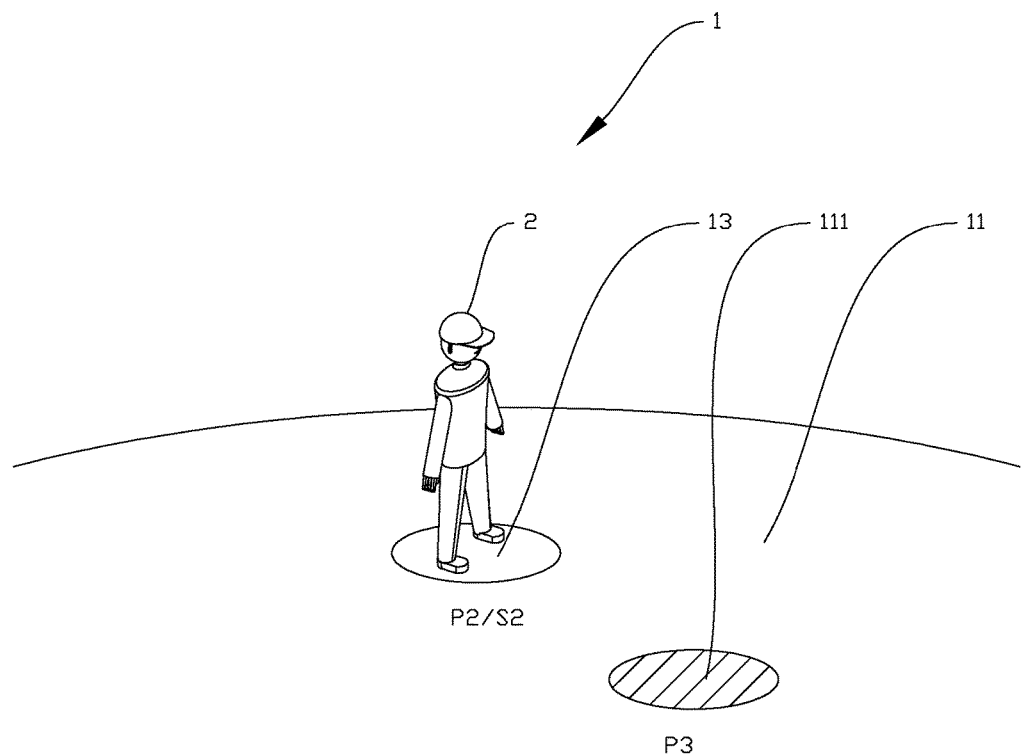

FIG. 1 shows the method of the present invention in its simplest form. A physically configurable space 1 includes a physically configurable element 11 in the form of a movement area on a floor. The movement area 11 is configurable by means of a control unit 5 which is arranged to control a plurality of light sources 111 placed in the movement area 11. The movement area 11 is further provided with several sensors 13 arranged to sense the location of a user 2 in the movement area 11. The sensors 13 may be of types known per se, mentioned in the general part of the application. They may be, for example, touch-sensitive sensors 13 placed in the movement area 11. The sensors 13 sense the first location P1 of a user 2 in the movement area 11. The sensors 13 are connected to a control unit 5 and are arranged to communicate with it. The communication may take place via electrical and/or optical communication cables, not shown, or via wireless communication of types known per se. On the basis of sensed information about the first location P1 of the user 2 in the movement area 11, the control unit 5 instructs the user 2 to move to a second location P2 in the movement area 11. This is done by activating light sources 111 in the second location P2, to which, desirably, the user 2 should move. As the user reaches the second location P2, the light sources 111 in the second location P2 will go out and new light sources 111 will light up to indicate a third location P3, as shown in FIG. 2. The distance between the third location P3 and the second location P2 may be larger than the distance between the second location P2 and the first location P1, as shown in FIGS. 1 and 2, so that the user's 2 moving space is gradually expanded. The allowed area within which the user may stay within the desired location may change from location to location, as indicated in FIGS. 1 and 2 by the lighted area at the third location P3 being smaller in FIG. 2 than the lighted area at the second location P2, as shown in FIG. 1.

Figure 3:
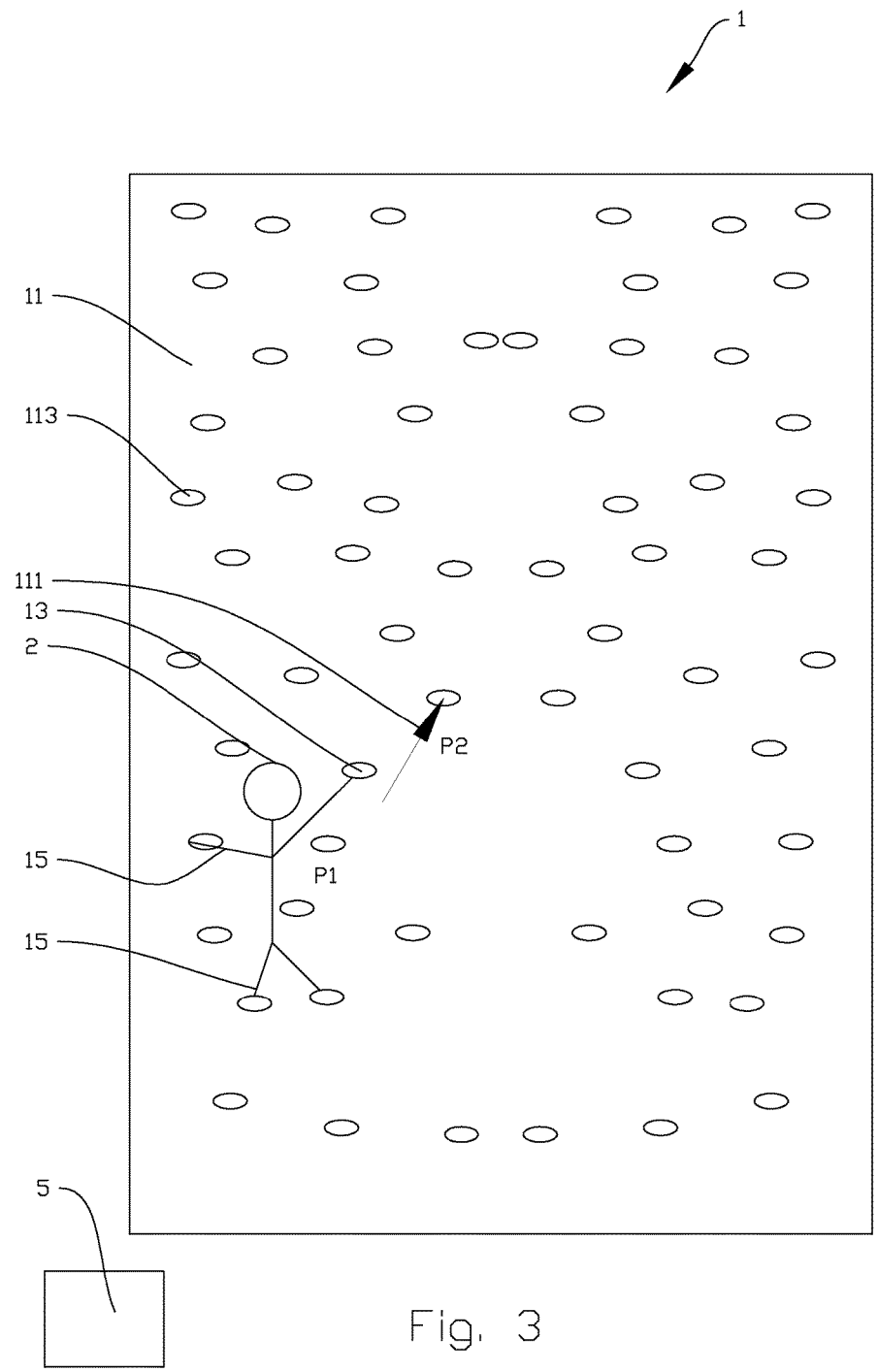
FIGS. 3-4 show a second embodiment in accordance with the present invention, viewed from the rear.
Figure 4:
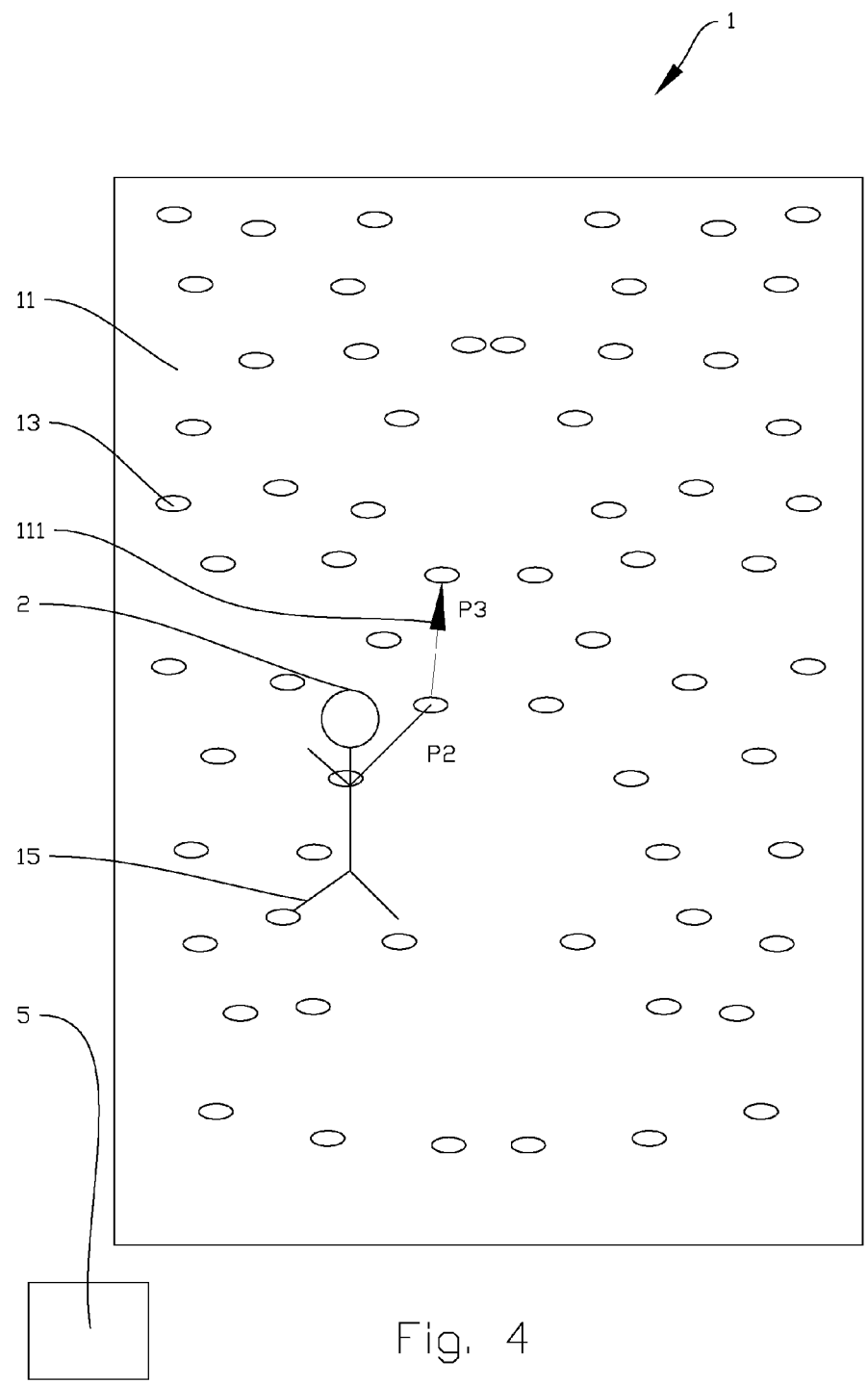

FIGS. 3 and 4 show a second embodiment in accordance with the present invention. The physically configurable space 1 includes a configurable element 11 in the form of a climbing wall. In FIG. 3, a user 2 is at a first location P1 on the climbing wall 11. The climbing wall 11 includes numerous holds 113 that the user 2 makes use of when climbing. The control unit 5 is arranged to control light sources 111 on the climbing wall 11 between a switched-off position and a switched-on position, the light sources 111 in their switched-on position forming arrows on the climbing wall 11, indicating the direction to a second location P2 on the climbing wall 11 for the user 2, as shown in FIG. 3. FIG. 4 shows that the user 2 has reached the second location P2 and that new light sources 111 are lit, indicating the direction to a third location P3 on the climbing wall 11. In the exemplary embodiment shown, the user 2 is provided with a plurality of radio-frequency identification transmitters 15 (RFID tags), whereas the climbing wall 11 is provided with a plurality of sensors 13 arranged to sense information transmitted from the user's RFID tags 15. The RFID tag 15 is placed on the user 2, in the user's shoe and/or in other climbing equipment that the user 2 is making use of, whereas the RFID sensors 13 are placed in the holds 113 proper. In alternative embodiments, the RFID sensors 13 may be placed elsewhere on or at the climbing wall 11. The RFID sensors 13 could transmit sensed information to the control unit 5 so that information is provided about the user's 2 location, position, speed and so on. This information may also be coupled with the above-mentioned physical data about the user for the preparation of a suggestion to the user 2 for the next location. The suggestion will thus be computed by means of the user's 2 capacity and desired improvement, among other things. Subjective targets and preferences may be entered manually into the control unit 5, or the control unit 5 may draw up realistic targets based on the user's 2 physical data and his and other users' earlier movements. Data from the movements of different users 2 may be stored in a storage unit connected to or included in the control unit 5.

Figure 5:
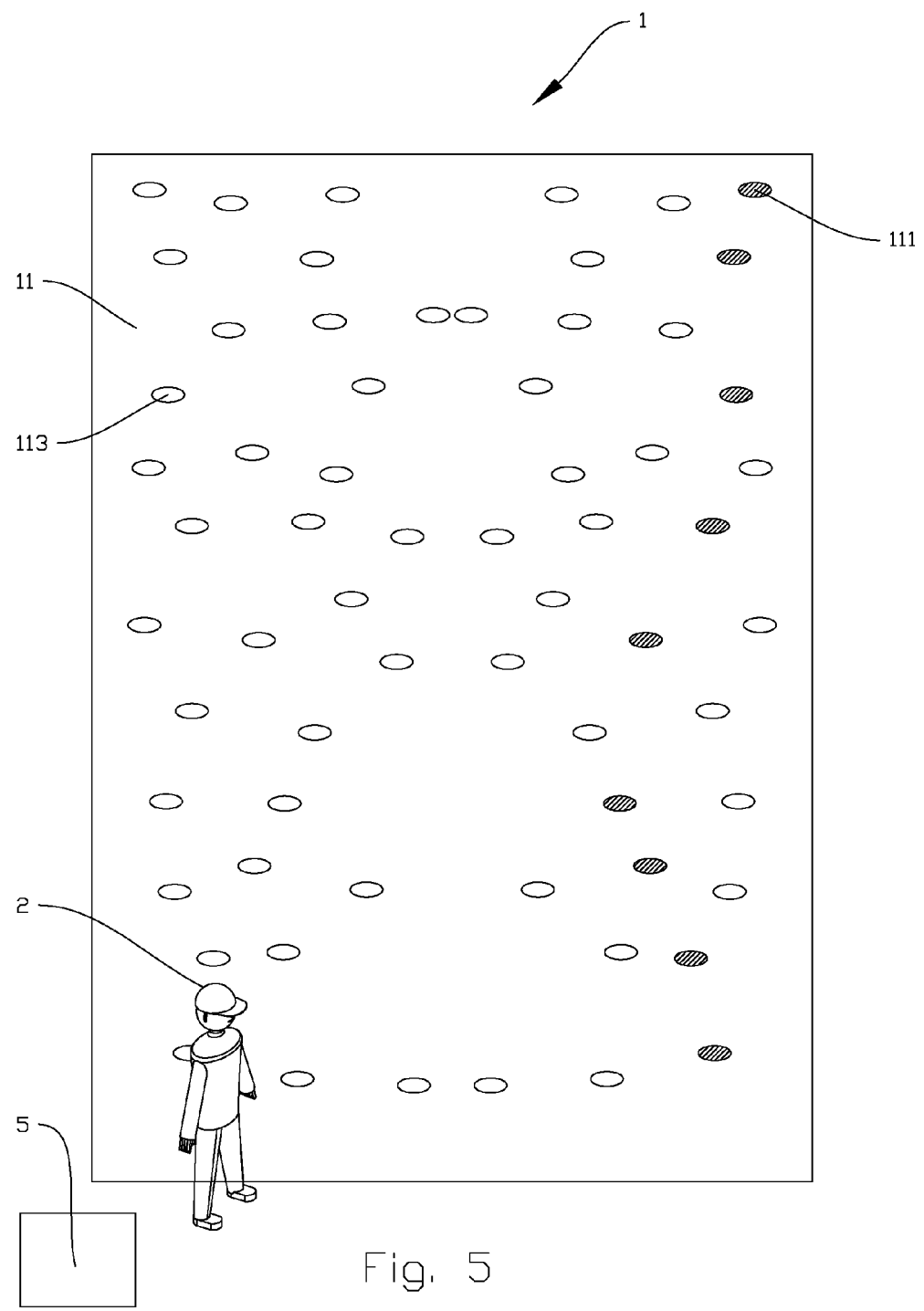
FIG. 5 shows a third embodiment in accordance with the present invention, viewed from the rear.

FIG. 5 outlines a third embodiment in accordance with the present invention, in which the holds 113 proper on the climbing wall 11 are provided with light sources 111 which are controllable by means of the control unit 5. The light sources 111 may be lit one by one as the user 2 moves up the climbing wall 11, or all the holds 113 forming a climbing route may be lit before the user 2 starts climbing the route as shown in the figure.

Figure 6:
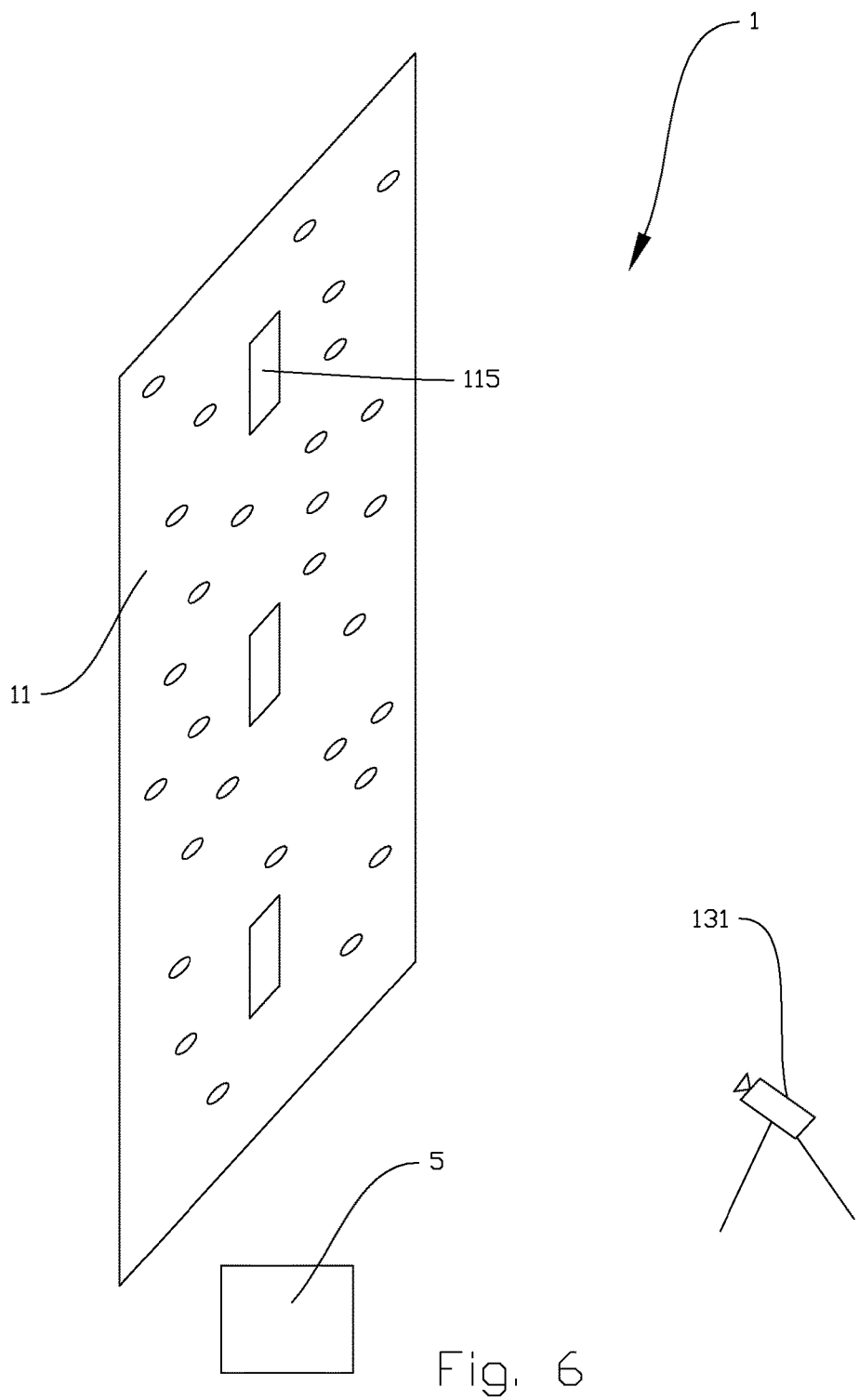
FIG. 6 shows a fourth embodiment in accordance with the present invention, viewed in perspective.

FIG. 6 shows a fourth embodiment in accordance with the present invention. A sensor 131 in the form of a camera has been arranged in such a way that it can detect the climbing wall 11. By means of an image-processing program and processing software, of types known per se, the location and position of a user 2, not shown in this case, on the climbing wall 11 may be detected, among other things. This information could further be used to calculate speeds, acceleration, power and so on in the user's 2 movement on the climbing wall 11. A plurality of screens 115 on the climbing wall 11 are used to show the user 2 suggested movements, grips and so on in the form of animations or films. The film that is shown on the screen 115 could be recordings of another user's movement on a corresponding climbing wall 11, whereas an animation may be a recreation of a user's earlier movements. The animations may be provided by means of software known per se.

The invention claimed is:

1. A method for movement in a physically configurable space, the space including one or more physically configurable elements, a first user being at a first location and in a first position in the physically configurable space, the method comprising:
    providing the physically configurable space with at least one sensor;
    connecting the at least one sensor to a control unit;
    sensing at least the first user's first location in the physically configurable space with the at least one sensor;
    configuring the at least one configurable element with the control unit on the basis of sensed information from the at least one sensor so that the first user's allowed moving space in the physically configurable space is altered;
    storing information about the first user's physical data in the control unit;
    storing information on the first user's movements in the physically configurable space in the control unit; and
    combining the information about the first user's physical data and movements in the physically configurable space and using the information about the first user's physical data and movements in the physically configurable space to configure the at least one configurable element.

2. The method in accordance with claim 1, further comprising configuring the at least one configurable element in such a way that an instruction is given to the first user to move to a second location in the physically configurable space.

3. The method in accordance with claim 1, further comprising configuring the at least one configurable element in such a way that the first user's allowed frame of movement is altered.

4. The method in accordance with claim 1, further comprising storing information on a second user's movement in the physically configurable space in the control unit.

5. The method in accordance with claim 1, further comprising providing the first user with one or more transmitters arranged to output a signal which can be sensed by the at least one sensor.

6. The method in accordance with claim 5, further comprising providing the first user with a radio-frequency identification tag.

7. A physically configurable space comprising:
    one or more physically configurable elements;
    at least one sensor arranged to sense at least a first user's first location in the space; and a control unit, to which the at least one sensor is connected, wherein the control unit is arranged to configure the at least one configurable element on the basis of sensed information from the at least one sensor, so that the first user's allowed moving space in the physically configurable space is altered;

wherein the control unit includes a storage unit adapted to store information about the first user's physical data, and information about the first user's movements in the physically configurable space; and wherein the control unit is adapted to use at least part of the information about the first user's physical data and movements in the physically configurable space to configure the at least one configurable element.

8. The physically configurable space in accordance with claim 7, wherein at least one of said at least one physically configurable element is a climbing wall.

9. The physically configurable space in accordance with claim 7, wherein at least one of said at least one sensor is selected from the group consisting of:
an optical sensor;
a pressure sensor;
a temperature sensor;
an electrical resistance sensor; and
a radio-frequency sensor.

10. The physically configurable space in accordance with claim 7, wherein the physically configurable space is symmetrically configurable around a mirror axis so that the first user may perform a first movement sequence and a second movement sequence that is laterally inverted to the first movement sequence so that balanced stress is achieved and injuries related to unbalanced stress are avoided.

11. The method in accordance with claim 1, wherein the physical data includes at least one of weight, height and age of the first user.

12. The method in accordance with claim 1, further comprising establishing a number of substantially identical, physically configurable spaces and connecting these to the control unit.

13. The method in accordance with claim 1, further comprising establishing a number of substantially identical, physically configurable spaces and connecting this to a storage unit.

14. The physically configurable space in accordance with claim 7, wherein the physical data includes at least one of weight, height and age of the first user.

15. A system comprising:
a plurality of physically configurable spaces, each comprising one or more physically configurable elements, a first user being at a first location and in a first position in at least a respective one of the plurality of physically configurable spaces, the system comprising
providing each of the plurality of physically configurable spaces with at least one sensor;
connecting the at least one sensor to a control unit;
sensing at least the first user's first location in the respective one of the plurality of physically configurable spaces with the at least one sensor;
configuring the at least one configurable element with the control unit on the basis of sensed information from the at least one sensor so that the first user's allowed moving space in the respective one of physically configurable space is altered;
storing information about the first user's physical data in the control unit;
storing information on the first user's movements in the respective one of the plurality of physically configurable spaces in the control unit; and
combining the information about the first user's physical data and movements in the respective one of the physically configurable spaces and using it to configure the at least one configurable element;
wherein the plurality of physically configurable spaces are connected to the control unit.

16. The system according to claim 13, wherein the plurality of physically configurable spaces are connected to a storage unit.

* * * * *